3,792,124
BLENDS OF CERTAIN BLOCK COPOLYMERS AND NEUTRALIZED COPOLYMERS OF ETHYLENE AND AN ACRYLIC ACID
Sol Davison and Michael Wales, Berkeley, Calif., assignors to Shell Oil Company
No Drawing. Filed Feb. 24, 1972, Ser. No. 229,176
Int. Cl. C08f 27/04, 29/34
U.S. Cl. 260—876 B                           5 Claims

ABSTRACT OF THE DISCLOSURE

Clear polymeric blends with improved adhesion are obtained from a combination of selectively hydrogenated block copolymers and ionomers comprising neutralized copolymers of ethylene and $\alpha$-$\beta$ unsaturated acids.

BACKGROUND OF THE INVENTION

Block copolymers have been developed rapidly within the recent past, the starting monomers usually being monoalkenyl arenes such as styrene or alpha methyl styrene and conjugated dienes, butadiene and isoprene. A typical block copolymer of this type is represented by the structure polystyrene-polybutadiene - polystyrene. When the monoalkenyl arene blocks comprise less than about 55% by weight of the block copolymer, the product is essentially elastomeric. Moreover, due to its peculiar set of physical properties it can be referred to more properly as a thermoplastic elastomer. By this is meant a polymer which in the melt state is processable in ordinary thermoplastic processing equipment but in the solid behaves like a chemically vulcanized rubber without chemical vulcanization having been effected. Polymers of this type are highly useful in that the vulcanization step is eliminated and, contrary to vulcanized scrap rubbers, the scrap from the processing of thermoplastic elastomers can be recycled for further use.

When the proportion of monoalkenyl arenes is increased beyond about 55 wt. percent of the polymer up to about 90% by weight of the polymer, the resulting product resembles a high impact thermoplastic material. Those block polymers which comprise in part conjugated diene polymer blocks have one substantial shortcoming, namely, their susceptiblity to oxidation or oxonolysis. Substantial improvements both in stability and compatibility with alpha-olefin polymers have been made by hydrogenation of such block polymers. The hydrogenation may be non-selective, selective or complete. Certain technical advantages have been found for selective hydrogenation wherein at least about 80% of the aliphatic double bonds are reduced and no more than about 25% of the aromatic double bonds are reduced by hydrogenation.

While these selectively hydrogenated block copolymers have vastly improved stability, they still have certain shortcomings which it would be desirable to eliminate or suppress. Chief among these are poor processability and relatively poor adhesion to many surfaces such as metals, glass and the like. It is possible, of course, to improve adhesion by derivatizing the block copolymers in such a manner as to insert certain polar groups such as carboxyls, hydroxyls, epoxys, etc., but this is not a desirable process if other means can be used, such as blending with suitable polar materials. One of the chief difficulties in imparting polarity to a block copolymer blend is to find a polymer which is sufficiently polar, inert toward the selectively hydrogenated block copolymer and, most importantly, is sufficiently compatible therewith that a suitable set of physical properties is obtained and, equally important, a clear composition is obtained as contrasted with hazy or opaque compositions. The problem of compatibility is not easily solved since most polymer species are incompatible to one degree or another as dictated by thermodynamic considerations.

Block polymers having selectively hydrogenated conjugated diene blocks are disclosed in U.S. Pat. 3,595,942.

In order to improve certain commercial objects such as golf ball covers, blends of non-hydrogenated block copolymers have been made containing certain ionomers. These are shown in South African application 5232/66. However, as indicated in that application, the working examples all show curing of the blends with peroxides usually in the presence of polyvalent metal oxides such as zinc oxide and the like. Such materials yield hard tough compositions which may have impact resistance but could hardly be described as elastomeric materials. For many purposes hazy or opaque blends are entirely unsatisfactory and would restrict their markets since clarity of films, for example, is highly desirable for many end uses. Opacity experienced in blending two types of materials indicates clearly that the two types of polymers are essentially incompatible.

It is an object of the present invention to provide improved block polymer compositions. It is a particular object of the invention to provide improved compositions comprising a selectively hydrogenated block copolymer and certain ionomers. It is a further object of the invention to provide such compositions which are essentially clear and exhibit improved adhesion to textiles, glass and metals. Other objects will become apparent during the following detailed description of the invention.

STATEMENT OF THE INVENTION

Now, in accordance with the present invention, polymeric compositions are provided comprising (a) 100 parts by weight of a block copolymer having at least two polymer blocks A and at least one polymer block B, each polymer block A being selected from the group consisting of monoalkenyl arene polymers and hydrogenated products thereof wherein no more than about 25% of the arene double bonds have been reduced, and at least one polymer block B, which is a polymer block of conjugated dienes wherein at least 80% of the aliphatic unsaturation has been reduced by hydrogenation of the polymer block; and (b) 5–95 parts by weight of an ionic copolymer made from ethylene, and alpha-beta-ethylenically unsaturated carboxylic acids having from 3–8 carbon atoms per molecule, said copolymers having from 10–90% of the carboxylic acid groups ionized by neutralization with metal ions, and in which the ethylene content is at least 75 mol percent and the carboxylic acid content is between 0.2 and 25 mol percent. In accordance with the present invention it has been found unexpectedly (1) that blends of these two types of polymers are clear indicating a high degree of mutual compatibility and (2) that the compositions have a highly satisfactory set of physical properties and adhere well to textiles, glass and metal surfaces. Contact angle measurements on these blends have confirmed a greatly enhanced wetting tendency against polar substrates.

The block copolymers with which this invention is concerned may have a variety of geometrical structures, since the invention does not depend on any specific geometrical structure, but rather upon the chemical constitution of each of the polymer blocks. Thus, the structures may be linear or branched as long as each molecule has at least two polymer blocks A and at least one polymer block B as defined above. Methods for the preparation of such polymers are known in the art. Particular reference will be made to the use of lithium-based catalysts and especially lithium alkyls for the preparation of the precursor polymers. The U.S. patent referred to hereinabove not only describes the polymers but also describes suitable methods for their hydrogenation. The structure of the polymers is determined by their methods of polymerization. For example, linear polymers result by sequential introduction of the desired monomers into the reaction vessel when using such initiators as lithium-alkyls or dilithiostilbene and the like, or by coupling an intermediate polymer with a difunctional coupling agent. Branched structures, on the other hand, may be obtained by the use of suitable coupling agents having a functionality with respect to the precursor polymers of three or more. Coupling may be effected with difunctional coupling agents such as dihaloalkanes or alkenes as well as certain polar compounds such as silicon halides, siloxanes or esters of monohydric alcohols with carboxylic acids. The presence of any coupling residues in the polymer may be ignored for an adequate description of the polymers forming a part of the compositions of this invention. Likewise in the generic sense, the specific structures may also be ignored. The invention applies especially to the use of selectively hydrogenated polymers having the configuration before hydrogenation of the following typical species:

polystyrene-polybutadiene-polystyrene
polystyrene-polyisoprene-polystyrene
poly(alpha methyl styrene)-polybutadiene-poly(alpha methyl styrene) and
poly(alpha methyl styrene)-polyisoprene-poly(alpha methyl styrene).

It will be understood that both blocks A and B may be either homopolymer or random copolymer blocks as long as each block predominates in at least one species of the monomers characterizing the blocks as defined hereinbefore. Thus blocks A may comprise styrene/alpha methyl styrene copolymer blocks or styrene/butadiene random copolymer blocks as long as the blocks individually predominate in monoalkenyl arenes. The term "monoalkenyl arene" will be taken to include especially styrene and its analogs and homologs including alpha methyl styrene and ring substituted styrenes, particularly ring methylated styrenes. The blocks B may comprise homopolymers of butadiene or isoprene, copolymers of butadiene with isoprene and copolymers of one of these two dienes with a monoalkenyl arene as long as the blocks B predominate in conjugated diene units.

Hydrogenation of the precursor block copolymers is preferably effected by use of catalyst comprising the reaction products of an aluminum alkyl compound with nickel or cobalt carboxylates or alkoxides under such conditions as to substantially completely hydrogenate at least 80% of the aliphatic double bonds and hydrogenating no more than about 25% of the alkenyl arene aromatic double bonds.

The average molecular weights of the individual blocks is not a critical aspect of the present invention. In most instances, however, the monoalkenyl arene blocks will have number average molecular weights in the order of 2,000–50,000 while the conjugated diene blocks either before or after hydrogenation or the equivalent alpha-olefin polymer blocks will have average molecular weights in the order of 20,000–300,000. These molecular weights are most accurately determined by tritium counting methods or osmotic pressure measurements.

The ionic hydrocarbon copolymers blended with the above types of selectively hydrogenated block copolymers or their equivalents comprise copolymers of ethylene, with apha, beta-ethylenically unsaturated carboxylic acids having one or two carboxylic acid groups, the acid monomer content of said polymer being from 0.2–25 mol percent based on the polymer, while the ethylene content of the polymer is at least 75 mol percent based on the polymer. The carboxylic acid-containing polymer has uniformly distributed throughout the polymer one or more metal ion species having ionized valencies of 1–3 inclusive, the quantity of the metal ion being sufficient to neutralize from 10–90% of the carboxylic acid. The concentration of the alpha-olefin is preferably greater than about 80 mol percent of the polymer. The carboxylic acid copolymerized therewith has from 3–8 carbon atoms per molecule including the carbon atoms in the carboxyl radical. Examples of such monomers are acrylic acid, methacrylic acid, ethacrylic, itaconic acid, maleic acid, fumaric acid and monoesters of dicarboxylic acids such as methyl hydrogen maleate, methyl hydrogen fumarate and the like. Although maleic anhydride is not a carboxylic acid in that it has no hydrogen attached to the carboxyl groups, it is to be considered in the present instance as included in the term "carboxylic acid" for the purposes of the present invention because of its chemical reactivity being that of an acid. Similarly, other alpha, beta-monoethylenically unsaturated anhydrides of carboxylic acids can be employed. Preferably the concentration of the acidic monomer in the copolymer is from 1–10 mol percent. Ionic hydrocarbon polymers falling within the above description are fully disclosed in U.S. Pat. 3,264,272.

In their unmodified state, these ionic copolymers are described in the above patent as "being useful as plastics." Consequently, one aspect of the present invention comprises the improvement in impact resistance and flexibility of these plastic-like materials by the blending therewith of the highly compatible selectively hydrogenated block copolymers described hereinbefore.

The molecular weights of the ionic copolymers useful as resin is most suitably defined by melt index, a measure of viscosity, described in detail in ASTM–D–1238–57T. The melt index of copolymers employed in the formation of ionic copolymers which are useful as plastics is preferably in the range of 0.1–1000 grams per ten minutes and, more particularly, in the range of 1.0–100 grams per 10 min. The lower molecular weight ionomers are especially useful in adhesives compositions when blended with the above described block copolymers. In general, it has been found that the neutralized ionic polymers preferably have average molecular weights as measured by melt index of 1–5 grams per 10 min., and a polymer having a mono-carboxylic acid concentration of 5–10% shows optimum solid state properties upon 50–80% neutralization.

The metal ions which are suitable in forming the ionic copolymers of the present invention, therefore comprise for the $\alpha$-olefin-monocarboxylic acid copolymers, mono-, di, and trivalent ions of metals in Groups I, II, III, IV–A and VIII of the Periodic Table of Elements (see p. 392), Handbook of Chemistry and Physics, Chemical Rubber Publishing Co., 37th ed.). Uncomplexed monovalent metal ions of the metals in the stated groups are also suitable in forming the ionic copolymers of the present invention with copolymers of olefins and ethylenically unsaturated dicarboxylic acids. Suitable monovalent metal ions are $Na^+$, $K^+$, $Li^+$, $Cs^+$, $Ag^+$, $Hg^+$ and $Cu^+$. Suitable divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$ and $Y^{+3}$.

The preferred metals, regardless of the nature of the base copolymer are the alkali metals. These metals are preferred because they result in ionic copolymers having the best combination of improvement in solid state properties with retention of melt fabricability. It is not essential that only one metal ion be employed in the formation of the ionic copolymers and more than one metal ion may be preferred in certain applications.

The quantity of ions employed or the degree of neutralization will differ with the degree of melt property change desired. In general, it was found that the concentration of the metal ion should be at least such that the metal ion neutralizes at least 10 percent of the carboxylic acid groups in order to obtain a significant change in properties. As explained above, the degree of neutralization for optimum properties will vary with the acid concentration and the molecular weight of the copolymer. However, it is generally desirable to neutralize at least 50 percent of the acid groups. The degree of neutralization may be measured by several techniques. Thus, infrared analysis may be employed and the degree of neutralization calculated from the changes resulting in the absorption bands. Another method comprises the titration of a solution of the ionic copolymer with a strong base. In general, it was found that the added metal ion reacts stoichiometrically with the carboxylic acid in the polymer up to 90 percent neutralization. Small excess quantities of the crosslinking agent are necessary to carry the neutralization to completion. However, large excess quantities of the crosslinking agent do not add to the properties of the ionic copolymer of the present invention, since once all carboxylic acid groups have been ionically crosslinked, no further crosslinks are formed.

The crosslinking of the ionic copolymer, if desired, may be carried out by the addition of a metal compound to the base copolymer. The metal compound which is employed must have at least one of its valences satisfied by a group which is substantially ionized in water. The necessary ionization is determined by the water solubility of the metal when bonded solely to the ionizable salt group. A compound is considered water-soluble for the purposes of the present invention if it is soluble in water at room temperature to the extent of 2 weight percent. This requirement is explained as separating those ionic compounds which are capable of exchanging a metal ion for the hydrogen ion of the carboxylic acid group in the copolymer from those which do not interact with the acid. The second requirement of the metal compound employed to give rise to the ionic crosslink is that the salt radical reacting with the hydrogen of the carboxylic acid group must form a compound which is removable from the copolymer at the reaction conditions. This requirement is essential to obtain the carboxylic acid group of the copolymer in ionic form and, furthermore, to remove the salt radical from the copolymer so that the attraction between the ionized carboxylic acid group of the copolymer and the metal ion is not overshadowed by the attraction of the metal ion and its original salt radical. With these two parameters it is, therefore, possible to determine those metal compounds which form metal ions having the required ionic valences.

Although the foregoing limits delineate metal compounds suitable in forming metal ions in the acid copolymers which result in ionic crosslinks, certain types of compounds are preferred because of their ready availability and ease of reaction. Preferred metal salts include formates, acetates, hydroxides and sufficient solubility, methoxides, ethoxides, nitrates, carbonates and bicarbonates. Metal compounds which are generally not suitable in resulting in ionic crosslinks include in partciular metal oxides because of their lack of solubility and the fact that such compounds form intractible compositions, metal salts of fatty acids which either are not sufficiently soluble or form compounds with the hydrogen of the acid which cannot be removed and metal coordination compounds which lack the necessary ionic character.

The above-described compositions exhibit a surprising clarity compared with blends of the selectively hydrogenated polymers with many other types of polymers and also compared with blends of non-hydrogenated precursor block copolymers with ionic copolymers described above. Moreover, as the working examples given hereinafter show, the blends have a highly satisfactory set of physical properties, the tensile strength and clarity of the compositions indicates the use of these blends for such purposes as the coating of glass fibers as well as coatings on metal surfaces and the like where clarity, flexibility and high tensile strength are highly desirable.

The compositions of this invention may be modified by other components such as oils, extruders, fillers, oligomers and polymers. Especially promising results are obtained by the addition of 1–50 phr. of at least one polymer of the group consisting of alpha olefin polymers, copolymers of at least one polymer of the group consisting of alpha olefin polymers, copolymers of at least two alpha olefins and copolymers of alpha olefins with esters of terminally ethylenically unsaturated carboxylic acids and saturated aliphatic alcohols, and copolymers of alpha olefins and esters of saturated monocarboxylic acids and terminally unsaturated aliphatic alcohols. The ester modified copolymers preferably contain 8–33% by weight of ester units, and the esters preferably have 3–5 carbon atoms per monomer inch, as described in U.S. Pat. 3,562,356. Typical species of these supplementary polymers include polyethylene, polypropylene, ethylene-propylene copolymers, ethylene-vinyl acetate copolymers and ethylene-ethyl acrylate copolymers.

The following examples illustrate the physical properties obtained by the blends of the present invention.

Example I

The ionomer employed in each of the following examples was a copolymer of ethylene with 4% methacrylic acid, 90% of the carboxyls of which were neutralized with sodium, and had the following properties:

Tensile strength _____p.s.i__ 3500
Elongation _____percent__ 350
Specific gravity _____ 0.93
Hardness (Shore) _____ 55
Optical transmittance _____percent__ 80

Homogeneous transparent compositions were obtained by the blending of either 18 or 50 phr. (parts per hundred weight of block polymer) with a selectively hydrogenated block copolymer. The latter was obtained by preparing a precursor polymer having the structure polystyrene-polybutadiene-polystyrene and hydrogenating the polybutadiene block. The block copolymer had block molecular weight of 10,000–50,000–10,000. The compounds containing the ionomer blended with the block copolymer were observed to have much greater adhesion to metal surfaces when applied in the melt state, indicating their use especially in adhesive and surface coatings. Also, by contact angle measurements with ethyl alcohol/water solutions, the critical surface tension was observed to be significantly higher than that of the block polymer alone, suggesting an increased affinity for dyes and inks on the surface of molded articles made from the blend. The following blends were tested for the properties indicated in the following table.

| Block polymer (phr.) | 100 | 100 | 100 |
|---|---|---|---|
| Ionomer (phr.) | 50 | 18 | 0 |
| Mineral oil (phr.) | | | 8 |
| Tensile strength, p.s.i. (23° C.) | 5,230 | 3,800 | 6,250 |
| Elongation at break, percent | 660 | 520 | 640 |
| Set at break, percent | 100 | 45 | 20 |
| 300% modulus, p.s.i | 1,100 | | 610 |

An evaluation of adhesion improvement by addition of the ionomer was obtained by comparison of peel strength with a reference blend containing polypropylene: The samples were compression molded against white canvasduck textile for 10′/200° C.

| Block polymer (phr.) | 100 | 100 |
|---|---|---|
| Ionomer (phr.) | 50 | |
| Polypropylene (phr.) | | 50 |
| Peel strength (p.l.i. at 2″/min., 23° C.) | 19.8 | 8.0 |

Example II

As referred to hereinabove, the basic compositions of the present invention may be modified by the presence of supplementary polymers. The properties of three component blends are given below, the supplementary polymers being polyethylene, polypropylene and ethylene-vinylacetate copolymer. The selectively hydrogenated block copolymer employed in the following blends had a precursor polymer with the structure polystyrene-polybutadiene-polystyrene of which the block molecular weights were 10,000–50,000–10,000. The polybutadiene block was substantially completely saturated by hydrogenation with essentially no alteration in the polystyrene blocks. Each of the three-component blends contained equal proportions of the supplementary polymer and the ionomer, the blends containing 25 phr. each of the supplementary polymer and of the ionomer, per 100 parts by weight of the selectively hydrogenated block copolymer. The following physical properties were obtained.

| | $T_B$, p.s.i. | $E_B$, percent | $Set_B$, percent | $M_{300}$, p.s.i. | Haze, percent |
|---|---|---|---|---|---|
| Low density ployethylene plus ionomer | 2,800 | 620 | 140 | 1,000 | 16 |
| Polypropylene plus ionomer | 3,000 | 610 | 130 | 1,200 | 29 |
| Ethylene/vinyl acetate copolymer plus ionomer | 4,400 | 640 | 92 | 800 | Opaque |

We claim as our invention:

1. An uncured composition comprising:
   (a) a linear or branched block copolymer having at least two polymer blocks A and at least one polymer block B, each polymer block A being selected from the group consisting of monoalkenyl arenes polymers and hydrogenated products thereof wherein no more than about 25% of the arene double bonds have been reduced, and polymer block B is a hydrogenated polymer block of a $C_{4-5}$ conjugated diene polymer wherein at least about 80% of the aliphatic unsaturation has been reduced by hydrogenation; and
   (b) 5–95 parts by weight, per 100 parts by weight of the block copolymer, of an ionic copolymer of ethylene, and $\alpha,\beta$-ethylenically unsaturated mono- or di-carboxylic acids having from 3 to 8 carbon atoms per molecule, said copolymers having from 10% to 90% of the carboxylic acid groups ionized by neutralization with metal ions selected from mono-, di- or trivalent metal ions of Groups I, II, III, IV–A and VII of the Periodic Table, and in which the $\alpha$-olefin content is at least 50 mol percent, and the unsaturated carboxylic acid content is between 0.2 and 25 mol percent.

2. A composition according to claim 1 wherein the block is one in which the blocks A comprise 20–55% by weight of the copolymer.

3. A composition according to claim 1 wherein the block copolymer is one in which blocks B are hydrogenated polybutadiene blocks, the nonhydrogenated precursors of which have between about 30 and about 55% 1,2 microstructure.

4. A composition according to claim 1 wherein the neutralizing metal of the ionic copolymer is an alkali metal.

5. An uncured composition according to claim 1 comprising:
   (a) 100 parts by weight of a block copolymer having the configuration polystyrene completely hydrogenated polybutadiene-polystyrene- wherein each polystyrene block has an average molecular weight between about 2,000 and 50,000 and the hydrogenated polybutadiene block has an average molecular weight between about 20,000 and 300,000; and
   (b) 5–95 parts by weight of a copolymer of methacrylic acid and ethylene, the methacrylic acid comprising 0.2–2.5 mol percent of the copolymer, 10–90% of the carboxyl groups of the acid being neutralized with sodium ions.

References Cited
UNITED STATES PATENTS

| | | | |
|---|---|---|---|
| 3,454,676 | 6/1969 | Busse | 260—889 |
| 3,562,356 | 2/1971 | Nyberg et al. | 260—876 B |
| 3,686,365 | 8/1972 | Sequeira | 260—876 B |

PAUL LIEBERMAN, Primary Examiner

J. ZIEGLER, Assistant Examiner

U.S. Cl. X.R.

260—880 B, 897 R; 161—216, 409; 117—132 C, 132 C B